(12) United States Patent
Tamura et al.

(10) Patent No.: US 11,301,624 B2
(45) Date of Patent: Apr. 12, 2022

(54) TOPIC INFERRING APPARATUS, TOPIC INFERRING METHOD, AND STORAGE MEDIUM

(71) Applicant: National Institute of Information and Communications Technology, Tokyo (JP)

(72) Inventors: Akihiro Tamura, Tokyo (JP); Eiichiro Sumita, Tokyo (JP); Yutaka Kidawara, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 903 days.

(21) Appl. No.: 16/079,221

(22) PCT Filed: Feb. 10, 2017

(86) PCT No.: PCT/JP2017/004935
§ 371 (c)(1),
(2) Date: Aug. 23, 2018

(87) PCT Pub. No.: WO2017/145811
PCT Pub. Date: Aug. 31, 2017

(65) Prior Publication Data
US 2021/0166135 A1    Jun. 3, 2021

(30) Foreign Application Priority Data

Feb. 24, 2016    (JP) .............................. JP2016-032931

(51) Int. Cl.
*G06F 40/20* (2020.01)
*G06F 17/18* (2006.01)
(Continued)

(52) U.S. Cl.
CPC .............. *G06F 40/20* (2020.01); *G06F 17/18* (2013.01); *G06F 40/45* (2020.01); *G06N 5/04* (2013.01)

(58) Field of Classification Search
CPC .......... G06F 40/00–58; G06F 16/3344; G06F 17/18; G06F 16/00; G06N 5/04
(Continued)

(56) References Cited

U.S. PATENT DOCUMENTS 8,458,197 B1 *   6/2013   Procopio ................. G06F 16/30
                                                                707/749
8,510,257 B2 *   8/2013   Archambeau ........ G06K 9/6255
                                                                706/52
(Continued)

FOREIGN PATENT DOCUMENTS

JP    2011-150450 A    8/2011

OTHER PUBLICATIONS

Du et al. "A segmented topic model based on the two-parameter Poisson-Dirichlet process". Mach Learn (2010) 81:5-19. DOI 10.1007/s10994-010-5197-4 (Year: 2010).*
(Continued)

*Primary Examiner* — Jesse S Pullias
(74) *Attorney, Agent, or Firm* — McDermott Will & Emery LLP

(57) ABSTRACT

In order to solve a problem that the level of precision in inferring a crosslingual topic of documents or words in a non-parallel corpus associated in the document level is not high, a topic inferring apparatus includes: a word distribution information storage unit in which word distribution information is stored in association with each of two or more languages; a document topic distribution generating unit that acquires document topic distribution information of a multilingual document set; a segment topic distribution gener-
(Continued)

ating unit that acquires segment topic distribution information of each segment, using the document topic distribution information; and a word topic determining unit that determines, for each word contained in two or more documents contained in the multilingual document set, a topic of each word using the segment topic distribution information. Accordingly, it is possible to improve the level of precision in inferring a topic.

5 Claims, 15 Drawing Sheets

(51) Int. Cl.
  *G06N 5/04* (2006.01)
  *G06F 40/45* (2020.01)
(58) Field of Classification Search
  USPC .......................... 704/1, 9, 10, 257, 270–275
  See application file for complete search history.

(56) References Cited

U.S. PATENT DOCUMENTS

| | | | | |
|---|---|---|---|---|
| 9,069,798 | B2* | 6/2015 | Hershey | G06F 16/20 |
| 10,204,101 | B2* | 2/2019 | Ma | G06F 40/47 |
| 2011/0179034 | A1 | 7/2011 | Takamatsu | |
| 2011/0258229 | A1* | 10/2011 | Ni | G06F 16/35 |
| | | | | 707/776 |

OTHER PUBLICATIONS

International Search Report dated May 9, 2017 issued in International Application No. PCT/JP2017/004935 (4 pages).
Konishi et al., "Review Topic Modeling with Statistical Language Property", The 3rd Forum on Data Engineering and Information Management Ronbunshu [online], Jul. 27, 2011 (Jul. 27, 2011), pp. 1 to 8, A8-2 (English Abstract).
Eriguchi, et al., "Tagengo Topic Medal ni yoru Parallel Corpus Seisei", Proceedings of the 20th Annual Meeting of the Association for Natural Language Processing [online], Mar. 10, 2014 (Mar. 10, 2014), pp. 741-744 (English Abstract only).
Sakata et al., "Multimodal Kankei Topic Model ni yoru Tagengokan Kankei Yosoku", The 6th Forum on Data Engineering and Information Management (Dai 12 Kai The Database Society of Japan Nenji Taikai) [online], May 3, 2014 (May 3, 2014), pp. 1-8, C4-5 (English Abstract).
David Mimno, Hanna M. Wallach, Jason Naradowsky, David A. Smith, and Andrew McCallum, Polylingual Topic Models, In Proc. EMNLP 2009, pp. 880-889, 2009.
Ivan Vuli'c, Wim De Smet, Jie Tang, and Marie-Francine Moens, Probabilistic Topic Modeling in Multilingual Settings: An Short Overview of Its Methodology and Applications, Information Processing & Management, vol. 51, No. 1, pp. 111-147, 2015.
Xiaochuan Ni, Jian-Tao Sun, Jian Hu, and Zheng Chen, Mining Multilingual Topics from Wikipedia, In Proc. WWW 2009, pp. 1155-1156, 2009.
First Office Action issued in CN Patent Application No. 201780011714. 4, dated Aug. 4, 2021 w/Machine English Translation.

* cited by examiner

```
 1: for each topic $k \in \{1, ..., K\}$ do
 2:    for each language $l \in \{e, f\}$ do
 3:       choose $\phi_k^l \sim$ Dirichlet$(\beta^l)$
 4:    end for
 5: end for
 6: for each document pair $d_i$ ($i \in \{1, ..., D\}$) do
 7:    choose $\theta_i \sim$ Dirichlet$(\alpha)$
 8:    if $y_i$ are not given then choose $y_i \sim$ Bernoulli$(\gamma_i)$
 9:    generate aligned segment sets $AS_i =$ genAS$(y_i)$
10:    for each set $AS_{ig}$ ($g \in \{1, ..., |AS_i|\}$) do
11:       choose $\nu_{ig} \sim$ PYP$(a, b, \theta_i)$
12:    end for
13:    for each language $l \in \{e, f\}$ do
14:       for each segment $s_{ij}^l$ ($j \in \{1, ..., S_i^l\}$) do
15:          get index of $s_{ij}^l$ in $AS_i$: $g =$ get_idx$(AS_i, s_{ij}^l)$
16:          for each word $w_{ijm}^l$ ($m \in \{1, ..., N_{ij}^l\}$) do
17:             choose $z_{ijm}^l \sim$ Multinomial$(\nu_{ig})$
18:             choose $w_{ijm}^l \sim p(w_{ijm}^l | z_{ijm}^l, \phi^l)$
19:          end for
20:       end for
21:    end for
22: end for
```

FIG.7

| Model | $K=100$ | $K=400$ | $K=2000$ |
|---|---|---|---|
| BiLDA | 693.6 | 530.7 | 479.9 |
| BiSTM | 522.8 | 431.1 | 398.7 |
| BiSTM+TS | 549.8 | 463.2 | - |

FIG.8

| $ACC_1$ | | | |
|---|---|---|---|
| Method | $K=100$ | $K=400$ | $K=2000$ |
| Cue(BiLDA) | 0.024 | 0.056 | 0.101 |
| Cue(BiSTM) | 0.052 | 0.105 | 0.180 |
| Cue(BiSTM+TS) | 0.049 | 0.092 | - |
| Liu(BiLDA) | 0.206 | 0.345 | 0.426 |
| Liu(BiSTM) | 0.282 | 0.413 | 0.475 |
| Liu(BiSTM+TS) | 0.278 | 0.394 | - |

| $ACC_{10}$ | | | |
|---|---|---|---|
| Method | $K=100$ | $K=400$ | $K=2000$ |
| Cue(BiLDA) | 0.093 | 0.170 | 0.281 |
| Cue(BiSTM) | 0.195 | 0.288 | 0.402 |
| Cue(BiSTM+TS) | 0.163 | 0.257 | - |
| Liu(BiLDA) | 0.463 | 0.550 | 0.603 |
| Liu(BiSTM) | 0.524 | 0.622 | 0.667 |
| Liu(BiSTM+TS) | 0.533 | 0.604 | - |

FIG.9

|  | Reference $y = 1$ | Reference $y = 0$ |
|---|---|---|
| Inference $y = 1$ | 186 | 167 |
| Inference $y = 0$ | 52 | 1139 |

FIG.10

| Model | Japanese article | English article |
|---|---|---|
| BiSTM | 4.8 | 2.9 |
| BiSTM+TS | 10.3 | 4.5 |

FIG.11

Algorithm 1 Generative Process of BiLDA
1: for each topic $k \in \{1, ..., K\}$ do
2:   for each language $l \in \{e, f\}$ do
3:     choose $\phi_k^l \sim \text{Dirichlet}(\beta^l)$
4:   end for
5: end for
6: for each document pair $d_i$ ($i \in \{1, ..., D\}$) do
7:   choose $\theta_i \sim \text{Dirichlet}(\alpha)$
8:   for each language $l \in \{e, f\}$ do
9:     for each word $w_{im}^l$ ($m \in \{1, ..., N_i^l\}$) do
10:      choose $z_{im}^l \sim \text{Multinomial}(\theta_i)$
11:      choose $w_{im}^l \sim p(w_{im}^l | z_{im}^l, \phi^l)$
12:    end for
13:  end for
14: end for

TOPIC INFERRING APPARATUS, TOPIC INFERRING METHOD, AND STORAGE MEDIUM

RELATED APPLICATIONS

This application is the U.S. National Phase under 35 U.S.C. § 371 of International Application No. PCT/JP2017/004935, filed on Feb. 10, 2017, which in turn claims the benefit of Japanese Application No. 2016-032931, filed on Feb. 24, 2016, the disclosures of which are incorporated in their entirety by reference herein.

TECHNICAL FIELD

The present invention relates to a topic inferring apparatus and the like for assigning crosslingual topics to documents or words in non-parallel corpora associated in the document level.

BACKGROUND ART

Conventionally, a large number of topic models are proposed that perform unsupervised analysis of latent topics hidden in documents. Topic models were initially for monolingual document sets, but, recently, multilingual topic models are proposed that analyze topics shared between languages among multilingual document sets, and are used in a large number of multilingual processing tasks such as crosslingual document classification and translation pair extraction (see Non-Patent Document 1).

Many of multilingual topic models, such as Bilingual Latent Dirichlet Allocation (BiLDA) (see Non-Patent Documents 2 and 3), infer topics from multilingual document sets (hereinafter, they may be referred to as comparable corpora) such as Wikipedia article sets in which subjects or fields are shared in the document level although they are not direct translations. Specifically, topic distributions of aligned documents are commonized using comparable corpus characteristics, thereby inferring topics reflecting the document-level alignments.

In BiLDA, topic distributions of aligned documents are commonized, thereby analyzing topics shared between languages hidden in multilingual documents.

Specifically, in BiLDA, a document topic distribution is acquired following an algorithm shown in FIG. 15, using a model shown in FIG. 14.

FIG. 14 shows a generative process and a graphical model for generating a comparable corpus composed of D document pairs written in languages e and f using BiLDA. Hereinafter, a document in language e in each document pair $d_i$ ($i \in \{1, \ldots, D\}$) is denoted by $d_i^e$, and a document in language f is denoted by $d_i^f$. In BiLDA, each topic ($k \in \{1, \ldots, K\}$) has a word distribution $\phi_k^e$ in language e and a word distribution $\phi_k^f$ in language f. Each word distribution $\phi_k^l$ ($l \in \{e,f\}$) is generated from a Dirichlet distribution with a parameter ß$^l$ (see Steps 1 to 5 in FIG. 15). In the generative process of a document pair $d_i$, first, a topic distribution $\theta_i$ for $d_i$ is generated from a Dirichlet distribution with a parameter $\alpha$ (Step 7 in FIG. 15). Accordingly, $d_i^e$ and $d_i^f$ that are aligned have a common topic distribution $\theta_i$. Subsequently, a latent topic $z_{im}^l$ is generated from a multinomial distribution (Multinomial($\theta_i$)) with a parameter $\theta_i$, for each word position $m \in \{1, \ldots, N_i^l\}$ of a document $d_i^l$ (Step 10 in FIG. 15). Then, a topic of a word $im^l$ is generated from a probability distribution $p(im^l|z_{im}^l, \phi^l)$, based on the embodied latent topic $z_{im}^l$ and the word distribution $\phi^l$ in language l (Step 11 in FIG. 15).

CITATION LIST

Non-Patent Document

Non-Patent Document 1: Ivan Vuli'c, Wim De Smet, Jie Tang, and Marie-Francine Moens. Probabilistic Topic Modeling in Multilingual Settings: An Short Overview of Its Methodology and Applications. Information Processing & Management, Vol. 51, No. 1, pp. 111-147, 2015.

Non-Patent Document 2: David Mimno, Hanna M. Wallach, Jason Naradowsky, David A. Smith, and Andrew McCallum. Polylingual Topic Models. In Proc. EMNLP 2009, pp. 880-889, 2009.

Non-Patent Document 3: Xiaochuan Ni, Jian-Tao Sun, Jian Hu, and Zheng Chen. Mining Multilingual Topics from Wikipedia. In Proc. WWW 2009, pp. 1155-1156, 2009.

SUMMARY OF INVENTION

Technical Problem

Meanwhile, almost all documents have a hierarchical structure "document—segment—word", and, in the case of comparable corpora, it is often the case that alignments are identified between those smaller than documents. Note that a segment refers to, for example, a paragraph or section that is a partial document, which is a portion constituting a document, and is larger than a word.

However, in conventional techniques, in the case of inferring a crosslingual topic of documents or words in a non-parallel corpus associated in the document level, the level of precision in inferring a topic is not high because segments are not taken into consideration.

It is an object of the present invention to improve the level of precision in inferring a topic, by inferring a topic using a new multilingual topic model in which segment-level alignments in a comparable corpus are taken into consideration.

Solution to Problem

A first aspect of the present invention is directed to a topic inferring apparatus including: a document set storage unit in which a multilingual document set is stored, which is a set of two or more documents in different languages each having two or more segments, the segments being a part of a document; an alignment management unit in which one or more segment-level alignments are managed, each of which is an alignment between two or more segments constituting two or more documents contained in the multilingual document set, and is an alignment between two or more segments contained in different documents; a word distribution information storage unit in which word distribution information indicating a word distribution of each of two or more topics is stored in association with each of two or more languages; a document topic distribution generating unit that probabilistically acquires document topic distribution information indicating a topic distribution in the multilingual document set, the topic distribution being common to documents in two or more languages; a segment topic distribution generating unit that probabilistically acquires, for one or more segment sets having two or more segments associated with each other in the one or more segment-level alignments, or for one or more segment sets and one or more segments not associated in the one or more segment-level alignments, segment topic distribution information indicating a topic distribution, and indicating the same topic distribution for two or more segments constituting the segment sets, using the document topic distribution information of documents containing segments; and a word topic determining unit that probabilistically determines, for each word contained in two or more documents contained in the multilingual document set, a topic of that word, using segment topic distribution information of a segment containing the word, and outputs the topic.

With this configuration, it is possible to improve the level of precision in inferring a crosslingual topic, by also taking an alignment in the level of segments that are smaller than documents into consideration.

Furthermore, a second aspect of the present invention is directed to the topic inferring apparatus according to the first aspect, further including: a word distribution information acquiring unit that acquires word distribution information indicating a word distribution, for each of the two or more topics, for each of the two or more languages, based on a Dirichlet distribution to which a predetermined first hyper parameter is given, wherein the word distribution information stored in the word distribution information storage unit is the word distribution information acquired by the word distribution information acquiring unit, the document topic distribution generating unit generates, for the multilingual document set, document topic distribution information, from a Dirichlet distribution to which a predetermined second hyper parameter is given, the topic inferring apparatus further includes a segment set acquiring unit that acquires one or more aligned segment sets, using the segment-level alignments, the segment topic distribution generating unit generates, for one or more segment sets acquired by the segment set acquiring unit, or for one or more segment sets acquired by the segment set acquiring unit and one or more segments not associated in the one or more segment-level alignments, segment topic distribution information, from a Pitman-Yor process using a base measure, which is document topic distribution information of a document containing one or more segments, a predetermined concentration parameter, and a predetermined discount parameter, and the word topic determining unit acquires, for each document in two or more languages, and for each segment contained in each document, a latent topic, which is a hidden variable, from a multinomial distribution in which segment topic distribution information of a segment is taken as a parameter, for each word position contained in each segment, probabilistically determines a topic of each word using the latent topic and word distribution information corresponding to the document, and outputs the topic.

With this configuration, it is possible to improve the level of precision in inferring a crosslingual topic, by also taking an alignment in the level of segments that are smaller than documents into consideration.

Furthermore, a third aspect of the present invention is directed to the topic inferring apparatus according to the first or second aspect, further including: a segment-level alignment acquiring unit that calculates a similarity between segments contained in two or more documents in different languages, contained in the multilingual document set, and acquires one or more segment-level alignments using the similarity, wherein the one or more segment-level alignments in the alignment management unit are the segment-level alignments acquired by the segment-level alignment acquiring unit.

With this configuration, in the case of precisely inferring a crosslingual topic of documents or words in a non-parallel corpus associated in the document level, segment-level alignments can be automatically inferred, and thus it is not necessary to provide segment-level alignments in advance.

Furthermore, a fourth aspect of the present invention is directed to the topic inferring apparatus according to the third aspect, wherein the segment-level alignment acquiring unit acquires one or more segment-level alignments, using a Bernoulli distribution in which the similarity between segments is taken as a parameter.

With this configuration, in the case of precisely inferring a crosslingual topic of documents or words in a non-parallel corpus associated in the document level, segment-level alignments can be automatically inferred, and thus it is not necessary to provide segment-level alignments in advance.

Furthermore, a fifth aspect of the present invention is directed to the topic inferring apparatus according to the third or fourth aspect, further including: a boundary inferring unit that determines, for each of two or more documents contained in the multilingual document set, whether or not each sentence contained in the documents is a segment separator sentence, wherein the segment-level alignment acquiring unit calculates a similarity between segments in which a sentence determined by the boundary inferring unit as a segment separator sentence is taken as a last sentence of a segment, and acquires one or more segment-level alignments using the similarity.

With this configuration, in the case of precisely inferring a crosslingual topic of documents or words in a non-parallel corpus associated in the document level, segment boundaries can also be automatically inferred.

Furthermore, a sixth aspect of the present invention is directed to the topic inferring apparatus according to the fifth aspect, wherein the boundary inferring unit determines whether or not each sentence contained in documents is a segment separator sentence, from a Bernoulli distribution of parameters acquired based on a beta distribution using a third hyper parameter and a fourth hyper parameter.

With this configuration, in the case of precisely inferring a crosslingual topic of documents or words in a non-parallel corpus associated in the document level, segment boundaries can also be automatically inferred.

Advantageous Effects of Invention

According to the topic inferring apparatus of the present invention, it is possible to improve the level of precision in inferring a crosslingual topic, by also taking an alignment in the level of segments that are smaller than documents into consideration.

BRIEF DESCRIPTION OF DRAWINGS

FIG. 7 is a diagram showing an algorithm of the topic inferring apparatus 1 in the embodiment.

FIG. 8 is a table showing an experimental result in the embodiment.

FIG. 9 is a table showing an experimental result in the embodiment.

FIG. 10 is a table showing an experimental result in the embodiment.

FIG. 11 is a table showing an experimental result in the embodiment.

FIG. 15 is a diagram showing an algorithm according to conventional techniques.

DESCRIPTION OF EMBODIMENT

Figure 1:
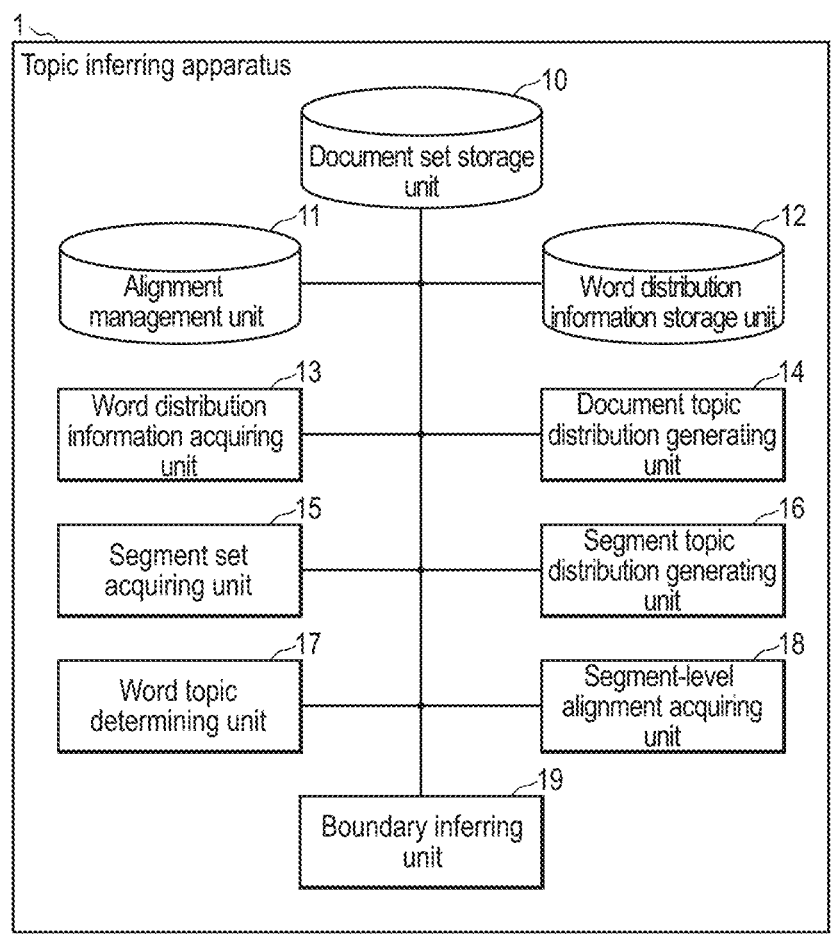
FIG. 1 is a block diagram of a topic inferring apparatus 1 in Embodiment 1.

Hereinafter, an embodiment of a topic inferring apparatus and the like will be described with reference to the drawings. Note that constituent elements denoted by the same reference numerals perform similar operations in the embodiments, and thus a description thereof may not be repeated.

Embodiment 1

In this embodiment, a topic inferring apparatus that infers a topic of words and a topic distribution of document sets, using segment-level alignments in a multilingual document set will be described.

Furthermore, in this embodiment, a topic inferring apparatus that automatically infers segment-level alignments of documents constituting a multilingual document set will be described.

Furthermore, in this embodiment, a topic inferring apparatus that automatically infers a segment boundary will be described.

FIG. 1 is a block diagram of a topic inferring apparatus 1 in this embodiment.

The topic inferring apparatus 1 includes a document set storage unit 10, an alignment management unit 11, a word distribution information storage unit 12, a word distribution information acquiring unit 13, a document topic distribution generating unit 14, a segment set acquiring unit 15, a segment topic distribution generating unit 16, a word topic determining unit 17, a segment-level alignment acquiring unit 18, and a boundary inferring unit 19.

In the document set storage unit 10, one or at least two multilingual document sets are stored. A multilingual document set is a set of two or more documents in different languages. Two or more documents constituting a multilingual document set are documents in which subjects or fields are common or shared although they are not direct translations. Each of two or more documents in different languages typically has two or more segments. A segment is part of a document. A segment is larger than a word and, is smaller than a document. A multilingual document set may be composed of two or more documents in which at least one or more documents have two or more segments.

In the alignment management unit 11, one or more segment-level alignments are managed. A segment-level alignment is typically information indicating an alignment between two or more segments. A segment-level alignments is information indicating an alignment between two or more segments constituting two or more documents contained in the multilingual document set, and indicating an alignment between two or more segments contained in different documents. A segment-level alignments is, for example, identifiers of two or more aligned segments, link information between two or more aligned segments, or the like. Note that two or more segments associated with each other in segment-level alignments are segments in different languages. The one or more segment-level alignments in the alignment management unit 11 are, for example, the segment-level alignments acquired by the segment-level alignment acquiring unit 18. Note that the one or more segment-level alignments in the alignment management unit 11 may be manually input information.

In the word distribution information storage unit 12, word distribution information indicating a word distribution of each of two or more topics is stored in association with each of two or more languages. There is no limitation on the topic size. The word distribution information stored in the word distribution information storage unit 12 is, for example, word distribution information acquired by the word distribution information acquiring unit 13, which will be described later. The word distribution information stored in the word distribution information storage unit 12 may be stored in advance. The number of pieces of the word distribution information stored in the word distribution information storage unit 12 is typically four or more.

The word distribution information acquiring unit 13 acquires word distribution information indicating a word distribution, for each of the two or more topics, for each of the two or more languages. The word distribution information acquiring unit 13 typically probabilistically acquires word distribution information indicating a word distribution, for each of the two or more topics, for each of the two or more languages.

The word distribution information acquiring unit 13 acquires word distribution information indicating a word distribution, for each of the two or more topics, for each of the two or more languages, for example, based on a Dirichlet distribution to which a predetermined first hyper parameter is given. The word distribution information acquiring unit 13 generates word distribution information from a Dirichlet distribution to which the first hyper parameter ß is given. There is no limitation on the first hyper parameter ß. For example, ß is a vector in which all elements are 0.1 and the number of dimensions is the number of words. The Dirichlet distribution is a known technique, and thus a detailed description thereof has been omitted.

Note that the word distribution information acquiring unit 13 may acquire word distribution information, for each of the two or more topics, for each of the two or more languages, using other methods. The word distribution information acquiring unit 13 may acquire probabilistically word distribution information, for example, using distributions (e.g., multinomial distribution) other than the Dirichlet distribution.

The document topic distribution generating unit 14 acquires document topic distribution information. The document topic distribution information is information indicating a topic distribution in the multilingual document set, and indicating a topic distribution common to documents in two or more languages. The document topic distribution generating unit 14 typically probabilistically acquires document topic distribution information.

The document topic distribution generating unit 14 generates, for a multilingual document set, document topic distribution information from a Dirichlet distribution to which a predetermined second hyper parameter is given. In this case, the second hyper parameter α is, for example, a K (topic size)-dimensional vector in which all elements are 0.1. There is no limitation on α.

Note that the document topic distribution generating unit 14 may acquire document topic distribution information using other methods. The document topic distribution generating unit 14 may probabilistically acquire document topic distribution information, for example, using distributions (e.g., multinomial distribution) other than the Dirichlet distribution.

The segment set acquiring unit 15 acquires one or more aligned segment sets, using the segment-level alignments. The segment set acquiring unit 15 may acquire non-aligned segments.

It is assumed that, for example, a document $d_i^e$ and a document $d_i^f$ that are aligned are stored in the document set storage unit 10. It is assumed that the document $d_i^e$ is a document in language e, and the document $d_i^f$ is a document in language f. Furthermore, it is assumed that the document $d_i^e$ has segments $\{s_{i1}^e, s_{i2}^e\}$, and the document $d_i^f$ has segment $\{s_{i1}^f, s_{i2}^f, s_{i3}^f\}$.

Furthermore, it is assumed that, in the alignment management unit 11, a segment-level alignment ($y_{i11}$ and $y_{i12}$ are 1) indicating that $\{s_{i1}^e\}$, $\{s_{i1}^f\}$, and $\{s_{i2}^f\}$ are aligned is stored. Note that a segment-level alignment "0" indicating an alignment between other segments may be stored in the alignment management unit 11. In this case, the segment set acquiring unit 15 generates $AS_i = \{AS_{i1} = \{s_{i1}^e, s_{i1}^f, s_{i2}^f\}, AS_{i2} = \{s_{i2}^e\}, AS_{i3} = \{s_{i3}^f\}\}$. Note that each of one or more segments $AS_{i2} = \{s_{i2}^e\}$ and $AS_{i3} = \{s_{i3}^f\}$ not associated in the segment-level alignments may be also referred to as a segment set. That is to say, a segment set is typically a set of two or more segments, but may be considered to include one segment as well.

The segment topic distribution generating unit 16 acquires, for one or more segment sets having two or more segments associated with each other in the one or more segment-level alignments, segment topic distribution information indicating a topic distribution, and indicating the same topic distribution for two or more segments constituting the segment sets, using the document topic distribution information of documents containing segments. The segment topic distribution generating unit 16 typically probabilistically generates segment topic distribution information.

Furthermore, the segment topic distribution generating unit 16 acquires, for one or more segment sets and one or more segments not associated in the one or more segment-level alignments, segment topic distribution information indicating a topic distribution, and indicating the same topic distribution for two or more segments constituting the segment sets, using the document topic distribution information of documents containing segments.

The segment topic distribution generating unit 16 acquires, for one or more segment sets acquired by the segment set acquiring unit 15, segment topic distribution information, using the document topic distribution information of documents containing segments.

The segment topic distribution generating unit 16 generates, for example, for one or more segment sets (which may include segments not associated in the segment-level alignments), segment topic distribution information, from a Pitman-Yor process using a base measure, which is document topic distribution information of a document containing one or more segments, a predetermined concentration parameter, and a predetermined discount parameter. Note that segments associated with each other in segment-level alignments have common segment topic distribution information.

The segment topic distribution generating unit 16 generates segment topic distribution information $v_{ig}$, for example, from a Pitman-Yor process with a base measure $\theta_i$, a concentration parameter a, and a discount parameter b. Note that $\theta_i$ is document topic distribution information of one or more documents containing one or more segments, the segments being contained in a segment set. The segment topic distribution generating unit 16 may generate segment topic distribution information, using other methods. Examples of other methods include a method for generating segment topic distribution information $v_{ig}$ from a Dirichlet process with a base measure $\theta_i$ and a concentration parameter a.

The word topic determining unit 17 determines, for each word contained in two or more documents contained in the multilingual document set, a topic of that word, using segment topic distribution information of a segment containing the word, and outputs the topic.

The word topic determining unit 17 acquires, for example, for each document in two or more languages, and for each segment contained in each document, a latent topic $z_{ijm}^l$, which is a hidden variable, from a multinomial distribution in which segment topic distribution information $v_{ig}$ of a segment is taken as a parameter, for each word position $m \in \{1, \ldots N_{ij}^l\}$ contained in each segment. Then, for example, the word topic determining unit 17 probabilistically determines a topic of each word using the latent topic $z_{ijm}^l$ and word distribution information $\phi^l$ corresponding to the document, and outputs the topic. Note that g is an index of a segment set containing the segment $s_{ij}^l$. It is sufficient that the word topic determining unit 17 probabilistically determines a topic of a word using the segment topic distribution information. The word topic determining unit 17 may probabilistically determine a topic of each word, using other methods using the segment topic distribution information. Examples of other methods include a method using other distributions (e.g., a Dirichlet distribution) instead of the above-described multinomial distribution.

The output is a concept that encompasses display on a display screen, projection using a projector, printing by a printer, output of a sound, transmission to an external apparatus, delivery of a processing result to another processing apparatus or another program, and the like.

The segment-level alignment acquiring unit 18 calculates a similarity between segments contained in two or more documents in different languages, contained in the multilingual document set, and acquires one or more segment-level alignments using the similarity.

The segment-level alignment acquiring unit 18 acquires one or more segment-level alignments, for example, using a Bernoulli distribution in which the similarity between segments is taken as a parameter. Note that the segment-level alignment acquiring unit 18 uses, for example, a cosine similarity of TF-IDF topic vectors of two segments, as the similarity between segments. In this example, the segment-level alignment acquiring unit 18 calculates weights of vectors, for example, while regarding a corpus not as a document set but as a segment set, and regarding each segment not as a word string but as a latent topic string, contrary to ordinary word TF-IDF. Note that the similarity between segments may be a cosine similarity of document vectors composed of word sets of segments. The method for calculating such a similarity is a known technique, and thus a detailed description thereof has been omitted.

Note that the segment-level alignment acquiring unit 18 acquires a segment-level alignment ($y_{ijj'}$), for example, based on Numerical Expression 1 below. Note that "$y_{ijj'}$" is information indicating whether or not two segments are aligned. The segment-level alignment ($y_{ijj'}$) may be, for example, either "0 (not aligned)" or "1 (aligned)".

$$p(y_{ijj'}=x|z,w,t,\alpha,\beta,a,b,y^{-y_{ijj'}}) \propto \cos(s_{ij}^e s_{ij'}^f)^x (1-\cos(s_{ij}^e, s_{ij'}^f))^{1-x} \text{ for } X \in \{0,1\}.$$

Numerical Expression 1

In Numerical Expression 1, x denotes a value of the segment-level alignment ($y_{ijj'}$), z denotes a hidden variable indicating a topic of a word, and w denotes a word. Variables for both languages e and f are expressed by omitting superscripts for language-dependent variables (e.g., $z=\{z^e, z^f\}$). t denotes a variable for a table of a Chinese restaurant process, a denotes a second hyper parameter, ß denotes a first hyper parameter, a denotes a concentration parameter, and b denotes a discount parameter. $y^{-y_{ijj'}}$ denotes a set of segment-level alignments obtained by excluding $y_{\{ijj'\}}$ from all segment-level alignments (y). $S_{ij}^e$ denotes a $j^{-th}$ segment of a document i in language e. $S_{ij}^f$ denotes a $h^{-th}$ segment of a document i in language f. $Cos(S_i^e, S_{ij}^f)$ denotes a cosine similarity between two segments.

Note that the segment-level alignment acquiring unit 18 and the like cannot directly calculate a posterior probability $p(\theta,v,z,\phi|\alpha,\beta,w,y)$ of hidden variables. Thus, the segment-level alignment acquiring unit 18 and the like infer hidden variables through Gibbs sampling. In this example, the segment-level alignment acquiring unit 18 and the like express a hierarchy (generative process of v and z) through a Chinese restaurant process. Through this process, θ, v, and ϕ are integrated out, and a variable t for a table of the Chinese restaurant process is introduced instead. Accordingly, the segment-level alignment acquiring unit 18 and the like perform inference by alternately repeating sampling of two types of variables z and t. In the case where y is not given as observed data, y is also inferred through sampling.

Gibbs sampling is a known technique, and is described in, for example, "David Mimno, Hanna M. Wallach, Jason Naradowsky, David A. Smith, and Andrew McCallum. Polylingual Topic Models. In Proc. EMNLP 2009, pp. 880-889, 2009", "Xiaochuan Ni, Jian-Tao Sun, Jian Hu, and Zheng Chen. Mining Multilingual Topics from Wikipedia. In Proc. WWW 2009, pp. 1155-1156, 2009", and "Ivan Vulic', Wim De Smet, Jie Tang, and Marie Francine Moens. Probabilistic Topic Modeling in Multilingual Settings: An Overview of Its Methodology and Applications. Information Processing & Management, Vol. 51, No. 1, pp. 111-147, 2015".

The segment-level alignment acquiring unit 18 and the like acquire θ, v, and ϕ, for example, using Gibbs sampling through a posterior probability shown in Numerical Expression 2.

Numerical Expression 2

$$\hat{\theta}_{ik} = \mathbb{E}_{z_i,t_i|w_i,\alpha,\beta,a,b,y}\left[\frac{\alpha_k + \sum^{} t}{\sum_{k=1}^{K}(\alpha_k + \sum^{} t)}\right],$$

$$\hat{v}_{ijk}^l = \mathbb{E}_{z_i,t_i|w_i,\alpha,\beta,a,b,y}\left[\frac{\sum^* n - a\sum^* t}{b + \sum^* N} + \theta_{ik}\frac{a\sum^* T + b}{b + \sum^* N}\right],$$

-continued $$\hat{\phi}_{kw}^l = \mathbb{E}_{z,t|w,\alpha,\beta,a,b,y}\left[\frac{\beta_w^l + M_{kw}^l}{\sum_{w' \in W^l}(\beta_{w'}^l + M_{kw'}^l)}\right],$$

where $$\sum\nolimits^* N \text{ stands for } \sum_{j' \in AS_i(j)} N_{ij'}^{l,j'}.$$

Regarding statistics used for inference in Numerical Expression 2 and the like, $t_{ijk}^l$ denotes the table count related to a topic k of a segment $s_{ij}^l$. $T_{ij}^l$ denotes the total table count ($\Sigma_k t_{ijk}^l$) in a segment $s_{ij}^l$. $n_{ijk}^l$ denotes the number of words of a topic k in a segment $s_{ij}^l$. $N_{ij}^l$ denotes the total number of words ($\Sigma_k n_{ijk}^l$) in a segment $s_{ij}^l$. $M_{kw}^l$ denotes the number of words w in which the topic is k in language l. $M_k^l$ denotes a $|w^l|$-dimensional vector in which the $w^{-th}$ element is $M_{kw}^l$.

Furthermore, a posterior distribution of $z_{ijm}^l$ is calculated using Gibbs sampling as shown in Numerical Expression 3, as described above.

Numerical Expression 3

$$p\left(z_{ijm}^l = k \mid z^{-z_{ijm}^l}, w, t, \alpha, \beta, a, b, y\right) \propto$$

$$\left(\frac{\alpha_k + \sum^{} t}{\sum_{k=1}^{K}(\alpha_k + \sum^{} t)}(b + \alpha\sum\nolimits^* T)\right)^{I(\Sigma^* n=0)}$$

$$\left(\frac{S(\sum^* n + 1, \sum^* t, a)}{S(\sum^* n, \sum^* t, a)}\right)^{I(\Sigma^* n>0)} \frac{\beta_{w_{ijm}^l}^l + M_{kw_{ijm}^l}^l}{\sum_{w \in W^l}(\beta_w^l + M_{kw}^l)},$$

Furthermore, a posterior distribution of $t_{ijk}^l$ is calculated using Gibbs sampling as shown in Numerical Expression 4, as described above.

Numerical Expression 4

$$p\left(t_{ijk}^l \mid z, w, t^{-t_{ijk}^l}, \alpha, \beta, a, b, y\right) \propto$$

$$\frac{\Gamma(\alpha_k + \sum^{} t)}{\Gamma\left(\sum_{k=1}^{K}(\alpha_k + \sum^{} t)\right)}(b \mid a)_{\Sigma^* T} S\left(\sum\nolimits^* n, \sum\nolimits^* t, a\right).$$

where $\sum^{**} t$ and $\sum^* t/T/n$ respectively stand for $$\sum_{G \in AS_i} \sum_{j \in G} t_{ijk}^{l,j} \text{ and}$$

$$\sum_{j' \in AS_i(j)} t_{ij'k}^{l,j'}/T_{ij'}^{l,j'}/n_{ij'k}^{l,j'}.$$

The segment-level alignment acquiring unit 18 may calculate, for example, a similarity between segments in which a sentence determined by the boundary inferring unit 19 as a segment separator sentence is taken as a last sentence of a segment, and acquire one or more segment-level alignments using the similarity.

The boundary inferring unit 19 determines, for each of two or more documents contained in the multilingual document set, whether or not each sentence contained in the documents is a segment separator sentence. The boundary inferring unit 19 may acquire delimiter information indicating whether or not each sentence contained in documents is a segment separator. Note that the delimiter information is, for example, either "1" or "0". For example, the delimiter information "1" indicates that it is a segment delimiter, and "0" indicates that it is not a delimiter. A separator and a delimiter have the same meaning.

The boundary inferring unit 19 determines whether or not each sentence contained in documents is a segment separator sentence, for example, from a Bernoulli distribution of parameters acquired based on a beta distribution using a third hyper parameter and a fourth hyper parameter.

For example, it is assumed that the boundary inferring unit 19 acquires delimiter information for sentences of documents having five sentences $\{u_{i1}^l, u_{i2}^l, u_{i3}^l, u_{i4}^l, u_{i5}^l\}$, and obtains, for example, a delimiter information vector $\rho_i^l = (0, 1, 0, 0, 1)$. Note that $\rho_i^l = (0, 1, 0, 0, 1)$ indicates that the second and fifth sentences are delimiters among the five sentences. In this case, this document $d_i^l$ has two segments. A segment 1 is $\{u_{i1}^l, u_{i2}^l\}$ (the first and second sentences), and a segment 2 is $\{u_{i3}^l, u_{i4}^l, u_{i5}^l\}$ (the third, fourth, and fifth sentences). Note that the delimiter information "1" indicates that it is a segment delimiter, and "0" indicates that it is not a delimiter.

The boundary inferring unit 19 may infer delimiter information ($\rho_{ih}^l$) of sentences, for example, using Gibbs sampling as shown in Numerical Expression 5.

Numerical Expression 5

$$p(\rho_{ih}^l = 1 \mid \rho^{l-\rho_{ih}^l}, z^l, w^l, t^l, \alpha, a, b, \lambda_0, \lambda_1) \propto \frac{\lambda_1 + c_{i1}^l}{\lambda_0 + \lambda_1 + c_{i0}^l + c_{i1}^l}$$

$$Beta_K\left(\alpha + \sum_{j=1}^{s_i^l} t_{ij}^l\right) \prod_{j \in \{s_i, s_r\}} \frac{(b \mid a)_{T_{ij}^l}}{(b)_{N_{ij}^l}} \prod_{k=1}^{K} S(n_{ijk}^l, t_{ijk}^l, a),$$

$$p(\rho_{ih}^l = 0 \mid \rho^{l-\rho_{ih}^l}, z^l, w^l, t^l, \alpha, a, b, \lambda_0, \lambda_1) \propto \sum_T \left( \frac{\lambda_0 + c_{i0}^l}{\lambda_0 + \lambda_1 + c_{i0}^l + c_{i1}^l} \right.$$

$$\left. Beta_K\left(\alpha + \sum_{j=1}^{s_i^l} t_{ij}^l\right) \frac{(b \mid a)_{T_{is_m}^l}}{(b)_{N_{is_m}^l}} \prod_{k=1}^{K} S(n_{is_mk}^l, t_{is_mk}^l, a) \right),$$

In Numerical Expression 5, $\rho_{ih}^l$ denotes delimiter information of a sentence h of a document i in language I. The upper expression indicates a case in which s_{m} is divided into s_{r} and s_{l} by setting $\rho_{ih}^l$ to 1, and the lower expression indicates a case in which s_{r} and s are merged into s_{m} by setting $\rho_{ih}^l$ to 0. T (which is positioned below Σ in the second line from below in Numerical Expression 5) is a set of $t_{ijk}^l$ in which $t_{ijk}^l$ of s_{r} or s_{l}, or both thereof is 1. $c_{i1}^l$ denotes the total number of sentences with the delimiter information "1" in a document i in language l. $c_{i0}^l$ denotes the total number of sentences with the delimiter information "0" in a document i in language I.

Note that the boundary inferring unit 19 may determine whether or not each sentence contained in documents is a segment separator sentence, using other methods. The boundary inferring unit 19 may determine whether or not each sentence contained in documents is a segment separator sentence, using other ordinary boundary inferring approaches. Examples of other ordinary boundary inferring approaches include a method using lexical cohesion, a method using cue phrases, and the like.

Note that, in the topic inferring apparatus 1, an unshown output unit may output document topic information, segment topic information, word topics, and the like.

Furthermore, in the topic inferring apparatus 1, segments may be given in advance in two or more documents contained in a multilingual document set in the document set storage unit 10. In this case, the boundary inferring unit 19 is not necessary.

Figure 2:
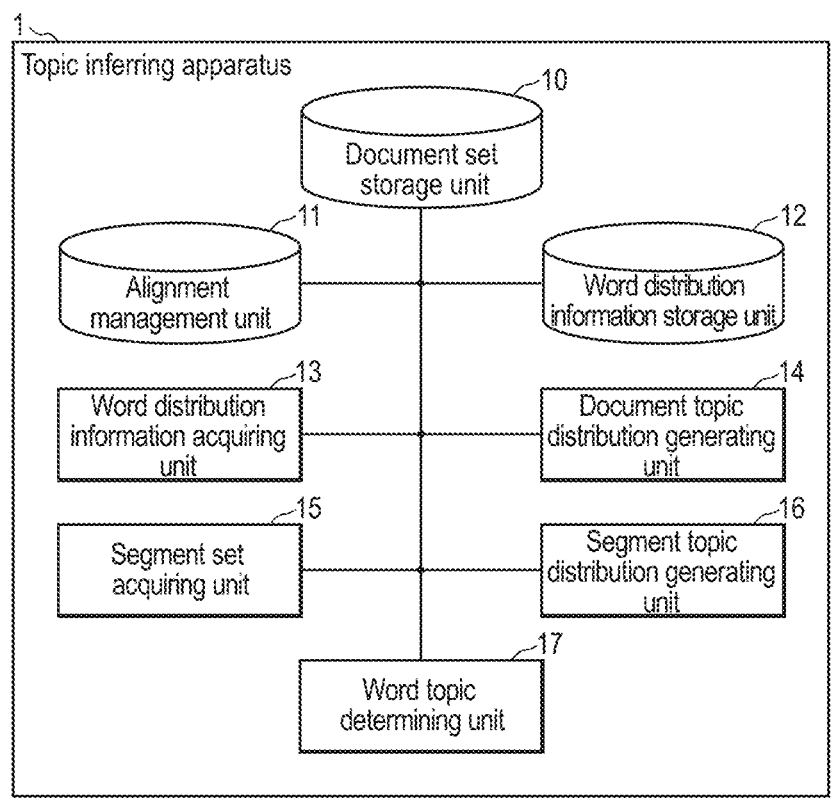
FIG. 2 is a block diagram of another topic inferring apparatus 1 in the embodiment.

Furthermore, in the topic inferring apparatus 1, one or more segment-level alignments indicating segment-level alignments may be given in advance. In this case, the segment-level alignment acquiring unit 18 is not necessary. FIG. 2 is a block diagram of the topic inferring apparatus 1 in this case.

Furthermore, for example, the word distribution information acquiring unit 13 may be performed in another apparatus. In FIG. 2, the word distribution information acquiring unit 13 is not necessary.

The document set storage unit 10, the alignment management unit 11, and the word distribution information storage unit 12 are preferably non-volatile storage media, but also may be realized by volatile storage media.

There is no limitation on the procedure in which a multilingual document set and the like are stored in the document set storage unit 10 and the like. For example, a multilingual document set and the like may be stored in the document set storage unit 10 and the like via a storage medium, a multilingual document set and the like transmitted via a communication line or the like may be stored in the document set storage unit 10 and the like, a multilingual document set and the like input via an input device may be stored in the document set storage unit 10 and the like.

The word distribution information acquiring unit 13, the document topic distribution generating unit 14, the segment set acquiring unit 15, the segment topic distribution generating unit 16, the word topic determining unit 17, the segment-level alignment acquiring unit 18, and the boundary inferring unit 19 may be realized typically by MPUs, memories, or the like. Typically, the processing procedure of the word distribution information acquiring unit 13 and the like is realized by software, and the software is stored in a storage medium such as a ROM. Note that the processing procedure may be realized also by hardware (dedicated circuits).

Next, an operation of the topic inferring apparatus 1 in FIG. 1 will be described with reference to the flowchart in FIG. 3. It is assumed that, in the flowchart in FIG. 3, two multilingual document sets are stored in the document set storage unit 10.

(Step S301) The word distribution information acquiring unit 13 substitutes 1 for a counter k.

(Step S302) The word distribution information acquiring unit 13 determines whether or not there is a $k^{-th}$ topic. If there is a $k^{-th}$ topic, the procedure advances to step S303, and, if not, the procedure advances to step S308. Note that information on topics is typically stored in an unshown storage unit in advance. The information on topics is one or more types of information among topic size, information for identifying a topic, and the like.

(Step S303) The word distribution information acquiring unit 13 substitutes 1 for a counter I.

(Step S304) The word distribution information acquiring unit 13 determines whether or not there is an $l^{-th}$ language. If there is an $l^{-th}$ language, the procedure advances to step S305, and, if not, the procedure advances to step S307. The number of languages that appear in documents may be determined by inspecting multilingual document sets in the document set storage unit 10, or information on languages that appear may be stored in an unshown storage unit in advance. Note that the information on languages that appear is the number of languages in documents constituting multilingual document sets, information for identifying languages in documents constituting multilingual document sets, or the like.

(Step S305) The word distribution information acquiring unit 13 acquires word distribution information of the $l^{-th}$ language (which may be referred to as a document in the $l^{-th}$ language) of the $k^{-th}$ topic. The word distribution information acquiring unit 13 acquires word distribution information, for example, based on a Dirichlet distribution to which a predetermined first hyper parameter is given.

(Step S306) The word distribution information acquiring unit 13 increments the counter l by 1, and the procedure returns to step S304.

(Step S307) The word distribution information acquiring unit 13 increments the counter k by 1, and the procedure returns to step S302.

(Step S308) The document topic distribution generating unit 14 substitutes 1 for a counter i.

(Step S309) The document topic distribution generating unit 14 determines whether or not there is an $i^{-th}$ multilingual document set in the document set storage unit 10. If there is an $i^{-th}$ multilingual document set, the procedure advances to step S310, and, if not, the procedure is ended. Before the procedure is ended, an unshown output unit may output document topic information, segment topic information, word topics, and the like.

(Step S310) The document topic distribution generating unit 14 acquires document topic distribution information of the $i^{-th}$ multilingual document set. The document topic distribution generating unit 14 generates document topic distribution information for the $i^{-th}$ multilingual document set, for example, from a Dirichlet distribution to which a predetermined second hyper parameter is given.

(Step S311) The segment-level alignment acquiring unit 18 determines whether or not there are one or more segment-level alignments in the alignment management unit 11. If there are one or more segment-level alignments, the procedure advances to step S313, and, if not, the procedure advances to step S312.

(Step S312) The segment-level alignment acquiring unit 18 calculates a similarity between segments, and acquires one or more segment-level alignments using the similarity. The segment-level alignment acquiring unit 18 acquires one or more segment-level alignments, for example, using a Bernoulli distribution in which the similarity between segments is taken as a parameter. Note that the similarity between segments is a similarity between segments contained in two or more documents in different languages contained in the multilingual document set.

(Step S313) The segment set acquiring unit 15 determines one or more aligned segment sets, using the one or more segment-level alignments. Note that the one or more segment sets are considered to include one segment that is not aligned with another segment.

(Step S314) The segment topic distribution generating unit 16 substitutes 1 for a counter g.

(Step S315) The segment topic distribution generating unit 16 determines whether or not there is a $g^{-th}$ segment set, among the segment sets acquired in step S313. If there is a $g^{-th}$ segment set, the procedure advances to step S316, and, if not, the procedure advances to step S318.

(Step S316) The segment topic distribution generating unit 16 acquires, for the $g^{-th}$ segment set, segment topic distribution information, using the one or at least two pieces of document topic distribution information of one or at least two documents containing this segment set. Note that the segment topic distribution generating unit 16 generates segment topic distribution information, for example, from a Pitman-Yor process with a base measure $\theta_i$, a concentration parameter a, and a discount parameter b.

(Step S317) The segment topic distribution generating unit 16 increments the counter g by 1, and the procedure returns to step S315.

(Step S318) The word topic determining unit 17 substitutes 1 for a counter l.

(Step S319) The word topic determining unit 17 determines whether or not there is a document in an $l^{-th}$ language in the documents in the $i^{-th}$ multilingual document set. If there is a document in an $l^{-th}$ language, the procedure advances to step S320, and, if not, the procedure advances to step S329.

(Step S320) The word topic determining unit 17 substitutes 1 for a counter j.

(Step S321) The word topic determining unit 17 determines whether or not there is a $j^{-th}$ segment in the document in the $l^{-th}$ language in the $i^{-th}$ multilingual document set. If there is a $j^{-th}$ segment, the procedure advances to step S322, and, if not, the procedure advances to step S328.

(Step S322) The word topic determining unit 17 acquires an index of the $j^{-th}$ segment in the document in the $l^{-th}$ language. There is no limitation on the index of the $j^{-th}$ segment, as long as it is information for identifying a $j^{-th}$ segment.

(Step S323) The word topic determining unit 17 substitutes 1 for a counter m.

(Step S324) The word topic determining unit 17 determines whether or not there is an $m^{-th}$ word position in the $j^{-th}$ segment. If there is an $m^{-th}$ word position, the procedure advances to step S325, and, if not, the procedure advances to step S327.

(Step S325) The word topic determining unit 17 acquires a word topic at the $m^{-th}$ word position, using the segment topic distribution information of the $j^{-th}$ segment. In this case, the word topic determining unit 17 may output a word topic at the $m^{-th}$ word position in a visually recognizable manner. The word topic determining unit 17 may, for example, acquire a latent topic, which is a hidden variable, from a multinomial distribution in which segment topic distribution information of a $j^{-th}$ segment is taken as a parameter, and probabilistically acquire a topic of each word using the latent topic and word distribution information corresponding to the document.

(Step S326) The word topic determining unit 17 increments the counter m by 1, and the procedure returns to step S324.

(Step S327) The word topic determining unit 17 increments the counter j by 1, and the procedure returns to step S321.

(Step S328) The word topic determining unit 17 increments the counter l by 1, and the procedure returns to step S319.

(Step S329) The document topic distribution generating unit 14 increments the counter i by 1, and the procedure returns to step S309.

Figure 3:
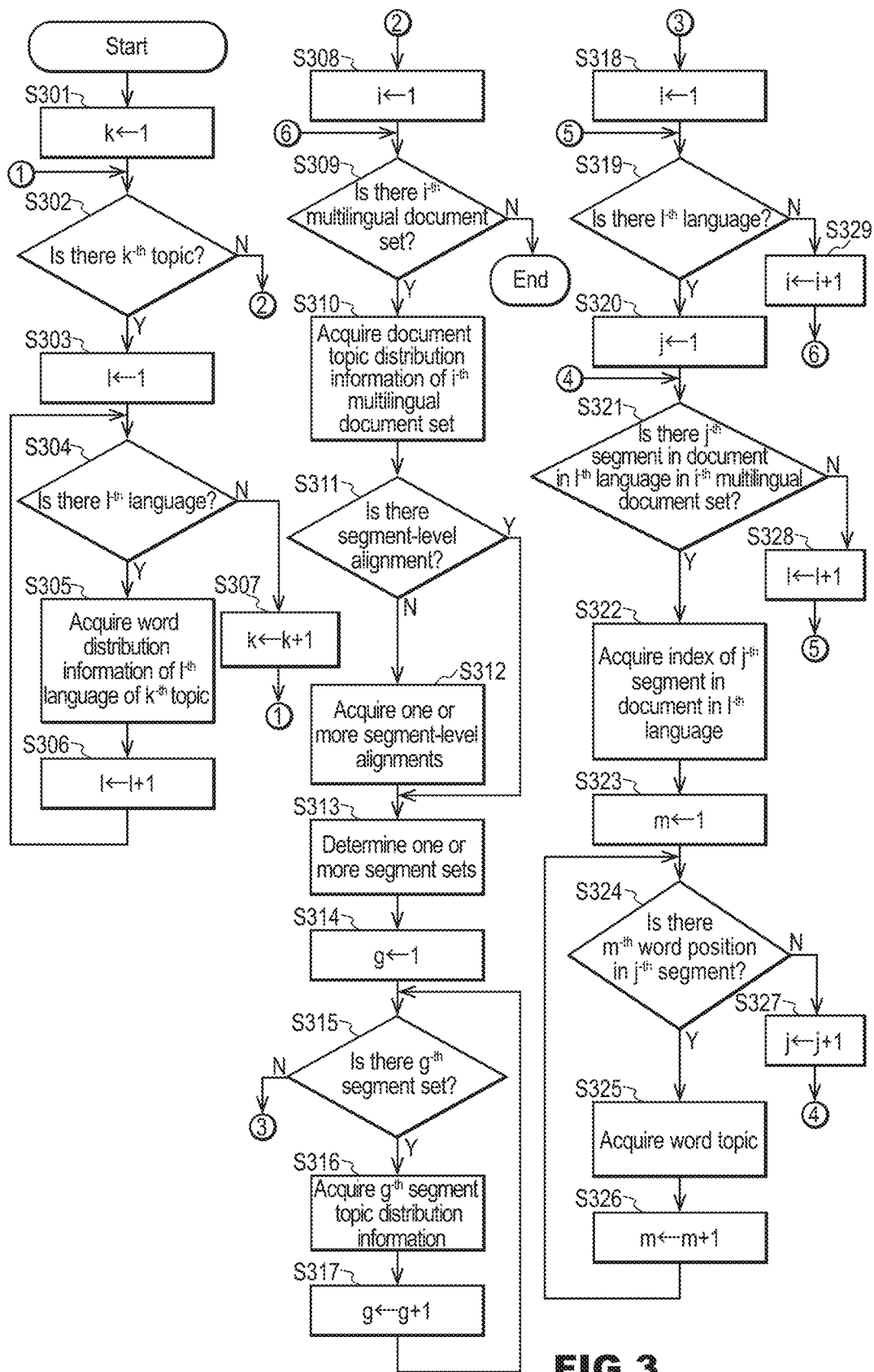
FIG. 3 is a flowchart illustrating an operation of the topic inferring apparatus 1 in the embodiment.

In the flowchart in FIG. 3, if there is no segment delimiter information in documents, the boundary inferring unit 19 may determine whether or not each sentence contained in the documents is a segment separator sentence, thereby acquiring segment delimiter information in the documents.

Figure 4:
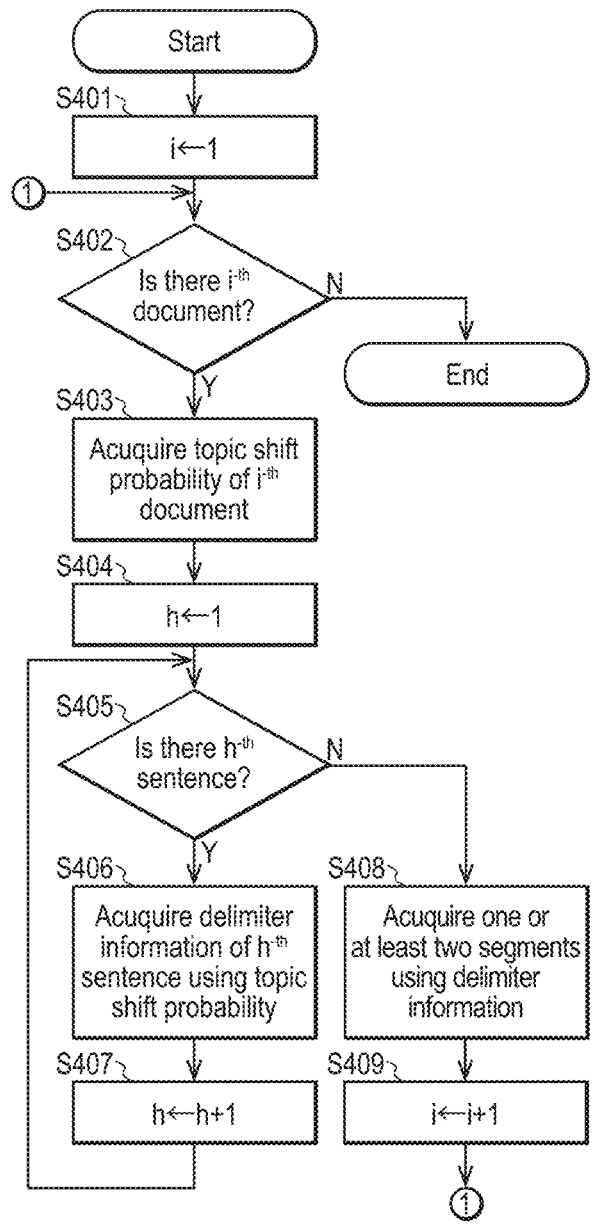
FIG. 4 is a flowchart illustrating an operation that detects a segment separator sentence of a document in the embodiment.

Hereinafter, an operation in which the boundary inferring unit 19 detects a segment separator sentence of a document not having a segment delimiter information will be described with reference to the flowchart in FIG. 4.

(Step S401) The boundary inferring unit 19 substitutes 1 for a counter i.

(Step S402) The boundary inferring unit 19 determines whether or not there is an $i^{-th}$ document that has not been divided into segments, in the document set storage unit 10. If there is an $i^{-th}$ document, the procedure advances to step S403, and, if not, the procedure is ended.

(Step S403) The boundary inferring unit 19 acquires a topic shift probability of the $i^{-th}$ document. The processing for acquiring a topic shift probability is a known technique, and thus a detailed description thereof has been omitted. A technique for acquiring a topic shift probability is similar to the technique described in "Lan Du, Wray Buntine, and Mark Johnson. 2013. Topic Segmentation with a Structured Topic Model. In Proceedings of the 2013 Conference of the North American Chapter of the Association for Computational Linguistics: Human Language Technologies, pages 190-200".

(Step S404) The boundary inferring unit 19 substitutes 1 for a counter h.

(Step S405) The boundary inferring unit 19 determines whether or not there is an $h^{-th}$ sentence in the $i^{-th}$ document. If there is an $h^{-th}$ sentence, the procedure advances to step S406, and, if not, the procedure advances to step S408.

(Step S406) The boundary inferring unit 19 acquires delimiter information of the $h^{-th}$ sentence, using the topic shift probability of the $i^{-th}$ document. The boundary inferring unit 19 gives, for example, the topic shift probability of the $i^{-th}$ document to a Bernoulli distribution, thereby acquiring delimiter information of the $h^{-th}$ sentence.

(Step S407) The boundary inferring unit 19 increments the counter h by 1. The procedure returns to step S405.

(Step S408) The boundary inferring unit 19 acquires one or at least two segments, using the delimiter information of sentences constituting the $i^{-th}$ document.

(Step S409) The boundary inferring unit 19 increments the counter i by 1. The procedure returns to step S402.

Figure 5:
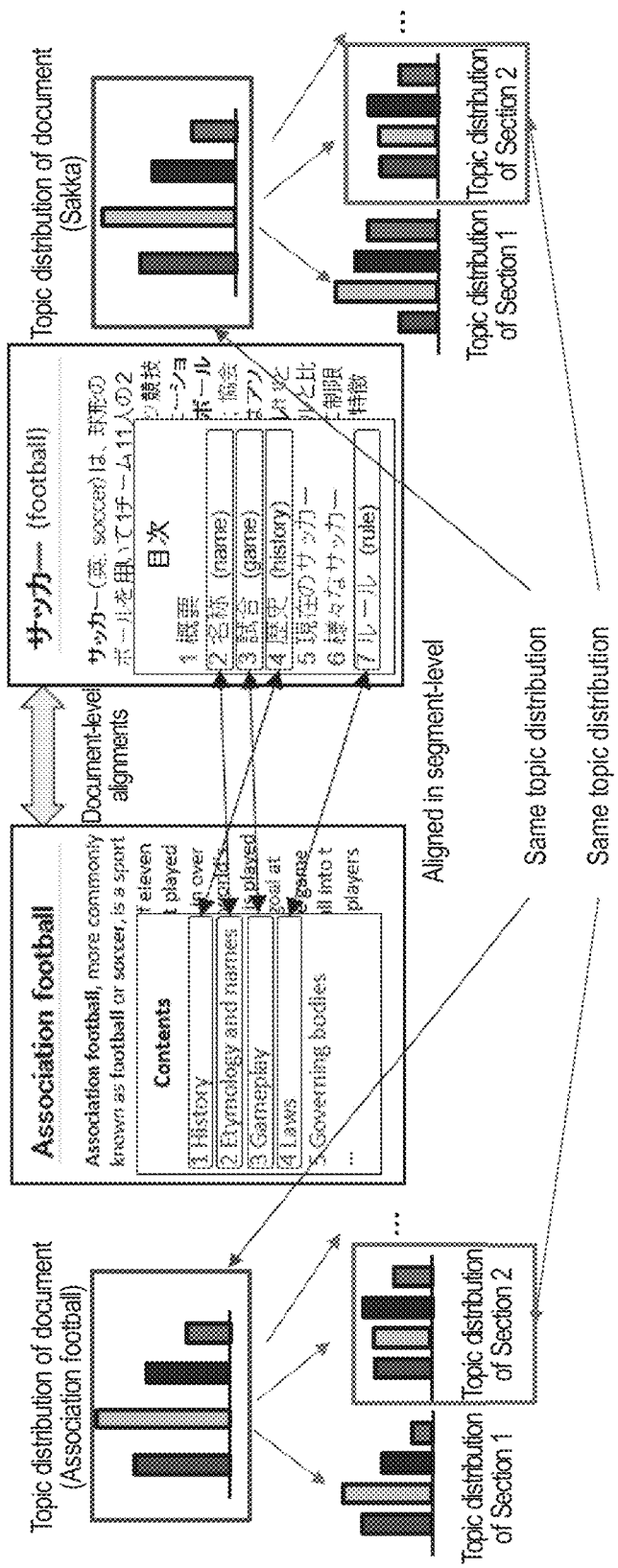
FIG. 5 is a conceptual diagram of an operation of the topic inferring apparatus 1 in the embodiment.

Hereinafter, a specific operation of the topic inferring apparatus 1 in this embodiment will be described. FIG. 5 is a conceptual diagram of an operation of the topic inferring apparatus 1. In FIG. 5, the topic inferring apparatus 1 focuses on the aspect that documents have a hierarchical structure, and are associated in the segment level. Note that the hierarchical structure of documents is, for example, documents→segment (e.g., sections, paragraphs)→words. In FIG. 5, a document of Association football in English and a document of Sakka (football) in Japanese are associated with each other. Furthermore, the section "History" and the section "Rekishi (History)" are associated with each other. The section "Etymology and names" and the section "Meisyo (name)" are associated with each other. The section "Gameplay" and the section "Shiai (game)" are associated with each other. Furthermore, the section "Laws" and the section "Ruru (rule)" are associated with each other. Then, in this case, the topic inferring apparatus 1 infers a topic assuming not only that aligned documents have the same topic distribution but also that aligned segments have the same topic distribution. The inferring a topic is, for example, acquiring one or more types of information among document topic distribution information, segment topic distribution information, and a topic of each word.

Figure 6:
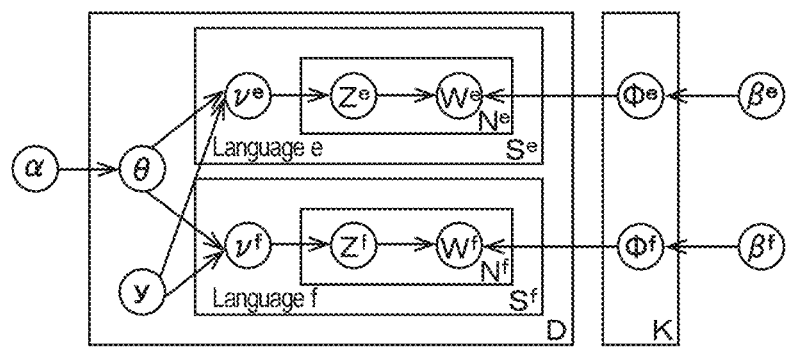
FIG. 6 is a diagram showing a graphical model of the topic inferring apparatus 1 in the embodiment.

FIG. 6 shows a graphical model of the topic inferring apparatus 1. In FIG. 6, α denotes a hyper parameter, θ denotes a document topic distribution, y denotes a binary variable indicating whether or not segments are aligned, $v^e$ and $v^f$ are a segment topic distribution in each language (e or f), $\phi_k^l$ ($l \in \{e,f\}$) denotes a word distribution, $\beta^l$ ($l \in \{e,f\}$) denotes a hyper parameter, $z^l$ ($l \in \{e,f\}$) denotes a latent topic of each language (e or f), $w^l$ ($l \in \{e,f\}$) denotes a topic of a word $im^l$ in each language (e or f), $N^l$ ($l \in \{e,f\}$) denotes a word position of a word in each language (e or f), and $s^l$ ($l \in \{e,f\}$) denotes a segment in each language (e or f).

FIG. 7 shows an algorithm of the topic inferring apparatus 1. The algorithm of the topic inferring apparatus 1 is referred to as "BiSTM" (Bilingual Segmented Topic Model) as appropriate.

BiSTM takes segment-level alignments into consideration. It is assumed that each document $d_i^l$ is composed of $s_i^l$ segments. In BiSTM, a segment topic distribution ($v^e$, $v^f$) in each language is inserted between a document topic distribution (θ) and a word topic ($z^e$, $z^f$), thereby hierarchically generating a document. Note that the topic distribution ($v^e$, $v^f$) is the above-described topic distribution information, and the topic distribution (θ) is the above-described document topic distribution information. Modeling reflecting segment-level alignments is performed by introducing a binary variable y (segment-level alignment) indicating whether or not segments are aligned. First, the topic inferring apparatus 1 generates, for each topic, language-specific word distribution $\phi_k^l$ (word distribution information) using a Dirichlet distribution (Steps 1 to 5 in FIG. 7). Then, in a generative process of a document pair $d_i$, first, a topic distribution $\theta_i$ for $d_i$ is generated (Step 7). Accordingly, in BiSTM, document pairs have a common topic distribution. Subsequently, an aligned segment set $AS_i$ is generated based on $y_i$ (Step 8). In this case, $y_{ijj}=1$ indicates that segment $s_{ij}^e$ and $s_{ij}^f$ are aligned, and $y_{ijj}=0$ indicates that they are not aligned. Subsequently, for each segment set $AS_{ig}$ ($g \in \{1, \ldots, |AS_i|\}$) in $AS_i$, a topic distribution $v_{ig}$ is generated from a Pitman-Yor process with a base measure $\theta_i$, a concentration parameter a, and a discount parameter b (Step 10). From Steps 8 to 11, aligned segments indicated by y have a common topic distribution. Lastly, for each word position $m \in \{1, \ldots, N_{ij}^l\}$ of a segment $s_{ij}^l$, a latent topic $z_{ijm}^l$ is generated from a multinomial distribution in which $v_{ig}$ is taken as a parameter (Step 16), and a word $ijm^l$ is generated based on the embodied $z_{ijm}^l$ and the word distribution $\phi^l$ (Step 17). In this case, g is an index of a segment set containing the segment $s_{ij}^l$, and is embodied in Step 14 in FIG. 7.

Experiment 1

Hereinafter, an experimental result of the topic inferring apparatus 1 will be described. In this experiment, the efficacy of the algorithm of the topic inferring apparatus 1 is evaluated in view of perplexity and translation pair extracting performance.

In this experiment, a Japanese-English comparable corpus composed of 3995 document pairs was used as experiment data. The experimental data was generated by collecting English articles corresponding to Japanese articles of Japanese-English Bilingual Corpus of Wikipedia's Kyoto Articles (Internet URL: https://alaginrc.nict.go.jp/WikiCorpus/) based on inter-language links in Wikipedia. Note that Japanese articles having no English articles corresponding thereto were removed. Japanese-English Bilingual Corpus of Wikipedia's Kyoto Articles is originally a parallel corpus obtained by manually translating sentences in Japanese article into English, and the English articles are not included in the experimental data. Morphological analysis was performed on Japanese text through MeCab (Internet URL: http://taku910.github.io/mecab/), and on English text through TreeTagger (Internet URL: http://www.cis.uni-muenchen.de/~schmid/tools/TreeTagger/), after which function words were removed and the remaining words were lemmatized.

For the experiment of translation pair extraction, a gold-standard set of translation pairs was automatically generated using the technique described in "Xiaodong Liu, Kevin Duh, and Yuji Matsumoto. Topic Models+Word Alignment=A Flexible Framework for Extracting Bilingual Dictionary from Comparable Corpus. In Proc. CoNLL 2013, pp. 212-221, 2013". First, $p(w^e|w^f)$ and $p(w^f|w^e)$ were calculated by running IBM model 4 on original Japanese-English Bilingual Corpus of Wikipedia's Kyoto Articles, and word pairs $(w^{\hat{}e}, w^{\hat{}f})$ satisfying both $w^{\hat{}e}=\mathrm{argmax}_{w^e}p(w^e|w^f=w^{\hat{}f})$ and $w^{\hat{}f}=\mathrm{argmax}_{w^f}p((w^f|w^e=w^{\hat{}e})$ were extracted. Subsequently, remaining word pairs, excluding word pairs not appearing in the document pairs of the comparable corpus, were taken as a gold-standard set. In the experiment of translation pair extraction, translated words corresponding to all the Japanese words 7930 in the gold-standard set were obtained.

Then, in this experiment, BiSTM and BiSTM+TS, which are the models of the topic inferring apparatus 1, and a conventional model BiLDA described in Non-Patent Documents 2 and 3 were compared. BiSTM is the algorithm of the topic inferring apparatus 1, and corresponds to the case where the boundary inferring unit 19 does not perform segment boundary inferring processing. BiSTM+TS is the algorithm of the topic inferring apparatus 1, and corresponds to the case where the boundary inferring unit 19 performs segment boundary inferring processing. In BiSTM, sections in the Wikipedia articles were taken as segments. Alignments between sections were not given to the experimental data, and thus, in BiSTM and BiSTM+TS, y was inferred using the above-described method. The inference in BiLDA was performed through Gibbs sampling (see "Mimno et al., 2009; Ni et at, 2009; Vulic' et at, 2015)") as in BiSTM. In the inference in each model, each variable was initialized at random, after which 10000 Gibbs iterations were performed. Note that z was initialized at random to an integer of 1 to K, $t_{ijk}^l$ was initialized at random to an integer of 0 to $n_{ijk}^l$, and y and ρ were initialized at random to 0 or 1. Then, the hyper parameters α and ß$^1$ were respectively set to symmetric parameters $\alpha_k$=50/K and $\text{ß}_w^l$=0.01, and the hyper parameters a, b, $\lambda_1$, and $\lambda_2$ were respectively set to 0.2, 10, 0.1, and 0.1. In order to investigate the influence of topic size, K was tested in three types of 100, 400, and 2000. In BiSTM+TS, "K=2000" was not tested.

In the experiment of translation pair extraction, two translation pair extracting approaches (Cue and Liu) were used. For Cue, see "Ivan Vulic', Wim De Smet, and Marie-Francine Moens. 2011. Identifying Word Translations from Comparable Corpora Using Latent Topic Models. In Proceedings of the 49th Annual Meeting of the Association for Computational Linguistics: Human Language Technologies, pages 479-484". For Liu, see "Xiaodong Liu, Kevin Duh, and Yuji Matsumoto. Topic Models+Word Alignment=A Flexible Framework for Extracting Bilingual Dictionary from Comparable Corpus. In Proc. CoNLL 2013, pp. 212-221, 2013". In these approaches, first, each word topic is inferred using a multilingual topic model (BiLDA or BiSTM or BiSTM+TS). Next, word pairs $(w^e, w^f)$ with a high value of the probability $p(w^e|w^f)$ were extracted based on the inferred topic.

In Cue, a probability $p(w^e|w^f)$ is calculated using Numerical Expression 6 below.

Numerical Expression 6

$$p(w^e | w^f) = \sum_{k=1}^{K} p(w^e | k)p(k | w^f),$$

where $$p(k | w) \propto \frac{p(w | k)}{\sum_{k=1}^{K} p(w | k)} \text{ and}$$

$$p(w | k) = \phi_{kw}.$$

In Liu, a comparable corpus is converted into a topic-level parallel corpus based on the inferred topic, and $p(w^e|w^f,k)$ is calculated by running IBM model 1 on the parallel corpus. Then, word pairs $(w^e, w^f)$ with a high value of the probability $p(w^e|w^f)=\Sigma_{k=1}^{K}p(w^e|w^f,k)p(k|w^f)$ are taken as translation pairs.

FIG. 8 shows a test set perplexity of each model as a result of the experiment. The perplexity was obtained through 5-fold cross-validation. A lower perplexity means a better model. It is seen from FIG. 8 that BiSTM is a model that outperforms BiLDA in terms of perplexity. It is also seen that BiSTM+TS is a model that outperforms BiLDA in terms of perplexity.

FIG. 9 shows an accuracy of translation pairs extracted using each model. As the accuracy, a top N accuracy (N=1 and 10) is used in which it is determined that a translation is correct in the case where the top N translation candidates contain a correct translation.

It is seen from FIG. 9 that, in both Cue and Liu methods, the accuracy was higher when using BiSTM than when using BiLDA. This difference was significant with a significance level of 1% in the sign test. Accordingly, it is seen that the translation pair extracting performance in BiSTM can be improved by assigning more suitable topics to words. It is also seen that BiSTM+TS has a higher accuracy than BiLDA.

Furthermore, in this experiment, a comparison of BiSTM+TS and BiSTM results with K=100 and 400 shows that they are evaluated as being excellent even in the case where segment boundaries are unknown in the approach of the topic inferring apparatus 1.

Furthermore, it is seen from FIG. 9 that use of Liu outperformed that of Cue.

As described above, it is experimentally seen that it is possible to improve the modeling performance of multilingual corpora, by taking segment-level alignments into consideration. It is also seen that a larger topic size yields better performance.

Experiment 2

Furthermore, an experiment was performed that acquires segment-level alignments in the segment-level alignment acquiring unit 18 of the topic inferring apparatus 1.

In this experiment, segment-level alignments y were inferred with BiSTM (K=2000). In this experiment, 100 document pairs were selected at random from a comparable corpus. Then, crosslingual alignments between sections (between segments) were manually identified, and y was inferred according to this approach. In FIG. 10, "Reference y=1" indicates a case in which a manually generated segment-level alignment y is "1", "Reference y=0" indicates a case in which a manually generated segment-level alignment y is "0", "Inference y=1" indicates a case in which a segment-level alignment y inferred according to this approach is "1", and "Inference y=0" indicates a case in which a segment-level alignment y inferred according to this approach is "0". That is to say, FIG. 10 shows that the accuracy was 0.858 (1325/1544). Note that this accuracy is derived from "1325=186+1139", which are cases where "Reference y=1" and "Inference y=1", or where "Reference y=0" and "Inference y=0", that is, cases where translations are correct. "167" and "52" are cases where translations are incorrect.

Experiment 3

Furthermore, an experiment was performed regarding inference of segment boundaries in the boundary inferring unit 19 of the topic inferring apparatus 1.

In this experiment, inference of segment boundaries with BiSTM+TS (K=400) and boundaries of original sections (segments) were compared. The recall of BiSTM+TS was 0.724.

FIG. 11 shows an experimental result in Experiment 3. In this experiment, both Japanese articles and English articles were used. FIG. 11 shows the average number of segments per article for each model (BiSTM, BiSTM+TS). It is seen from FIG. 11 that BiSTM+TS divides an article into segments smaller than the original sections. However, this result is preferable because the original sections include multiple topics. It is seen from FIG. 11 that BiSTM+TS increases the gap between languages. This indicates that segmentation with a comparable granularity between languages might be favorable for this approach (BiSTM+TS).

As described above, with this embodiment, it is possible to improve the level of precision in inferring a crosslingual topic, by also taking an alignment in the level of segments that are smaller than documents into consideration.

Furthermore, according to this embodiment, in the case of precisely inferring a crosslingual topic of documents or words in a non-parallel corpus associated in the document level, segment-level alignments can be automatically inferred, and thus it is not necessary to provide segment-level alignments in advance.

Furthermore, according to this embodiment, in the case of precisely inferring a crosslingual topic of documents or words in a non-parallel corpus associated in the document level, segment boundaries can also be automatically inferred.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the topic inferring apparatus in this embodiment may be the following sort of program. Specifically, this program is a program, using a computer-accessible storage medium including: a document set storage unit in which a multilingual document set is stored, which is a set of two or more documents in different languages each having two or more segments, the segments being a part of a document; an alignment management unit in which one or more segment-level alignments are managed, each of which is an alignment between two or more segments constituting two or more documents contained in the multilingual document set, and is an alignment between two or more segments contained in different documents; and a word distribution information storage unit in which word distribution information indicating a word distribution of each of two or more topics is stored in association with each of two or more languages, the program causing a computer to function as: a document topic distribution generating unit that probabilistically acquires document topic distribution information indicating a topic distribution in the multilingual document set, the topic distribution being common to documents in two or more languages; a segment topic distribution generating unit that probabilistically acquires, for one or more segment sets having two or more segments associated with each other in the one or more segment-level alignments, or for one or more segment sets and one or more segments not associated in the one or more segment-level alignments, segment topic distribution information indicating a topic distribution, and indicating the same topic distribution for two or more segments constituting the segment sets, using the document topic distribution information of documents containing segments; and a word topic determining unit that probabilistically determines, for each word contained in two or more documents contained in the multilingual document set, a topic of that word, using segment topic distribution information of a segment containing the word, and outputs the topic.

It is preferable that the program causes the computer to further function as: a word distribution information acquiring unit that acquires word distribution information indicating a word distribution, for each of the two or more topics, for each of the two or more languages, based on a Dirichlet distribution to which a predetermined first hyper parameter is given, wherein the word distribution information stored in the word distribution information storage unit is the word distribution information acquired by the word distribution information acquiring unit, the document topic distribution generating unit generates, for the multilingual document set, document topic distribution information, from a Dirichlet distribution to which a predetermined second hyper parameter is given, the computer is caused to further function as a segment set acquiring unit that acquires one or more aligned segment sets, using the segment-level alignments, the segment topic distribution generating unit generates, for one or more segment sets acquired by the segment set acquiring unit, or for one or more segment sets acquired by the segment set acquiring unit and one or more segments not associated in the one or more segment-level alignments, segment topic distribution information, from a Pitman-Yor process using a base measure, which is document topic distribution information of a document containing one or more segments, a predetermined concentration parameter, and a predetermined discount parameter, the word topic determining unit acquires, for each document in two or more languages, and for each segment contained in each document, a latent topic, which is a hidden variable, from a multinomial distribution in which segment topic distribution information of a segment is taken as a parameter, for each word position contained in each segment, probabilistically determines a topic of each word using the latent topic and word distribution information corresponding to the document, and outputs the topic.

It is preferable that the program causes the computer to further function as: a segment-level alignment acquiring unit that calculates a similarity between segments contained in two or more documents in different languages, contained in the multilingual document set, and acquires one or more segment-level alignments using the similarity, wherein the one or more segment-level alignments in the alignment management unit are the segment-level alignments acquired by the segment-level alignment acquiring unit.

It is preferable that the program causes the computer to operate such that the segment-level alignment acquiring unit acquires one or more segment-level alignments, using a Bernoulli distribution in which the similarity between segments is taken as a parameter.

It is preferable that the program causes the computer to further function as: a boundary inferring unit that determines, for each of two or more documents contained in the multilingual document set, whether or not each sentence contained in the documents is a segment separator sentence, wherein the segment-level alignment acquiring unit calculates a similarity between segments in which a sentence determined by the boundary inferring unit as a segment separator sentence is taken as a last sentence of a segment, and acquires one or more segment-level alignments using the similarity.

It is preferable that the program causes the computer to operate such that the boundary inferring unit determines whether or not each sentence contained in documents is a segment separator sentence, from a Bernoulli distribution of parameters acquired based on a beta distribution using a third hyper parameter and a fourth hyper parameter.

Figure 12:
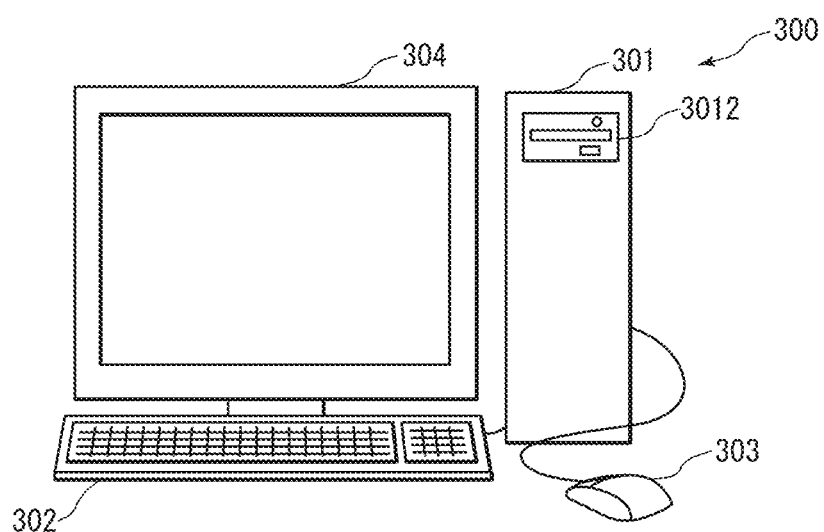
FIG. 12 is a schematic view of a computer system in the embodiment.
Figure 13:
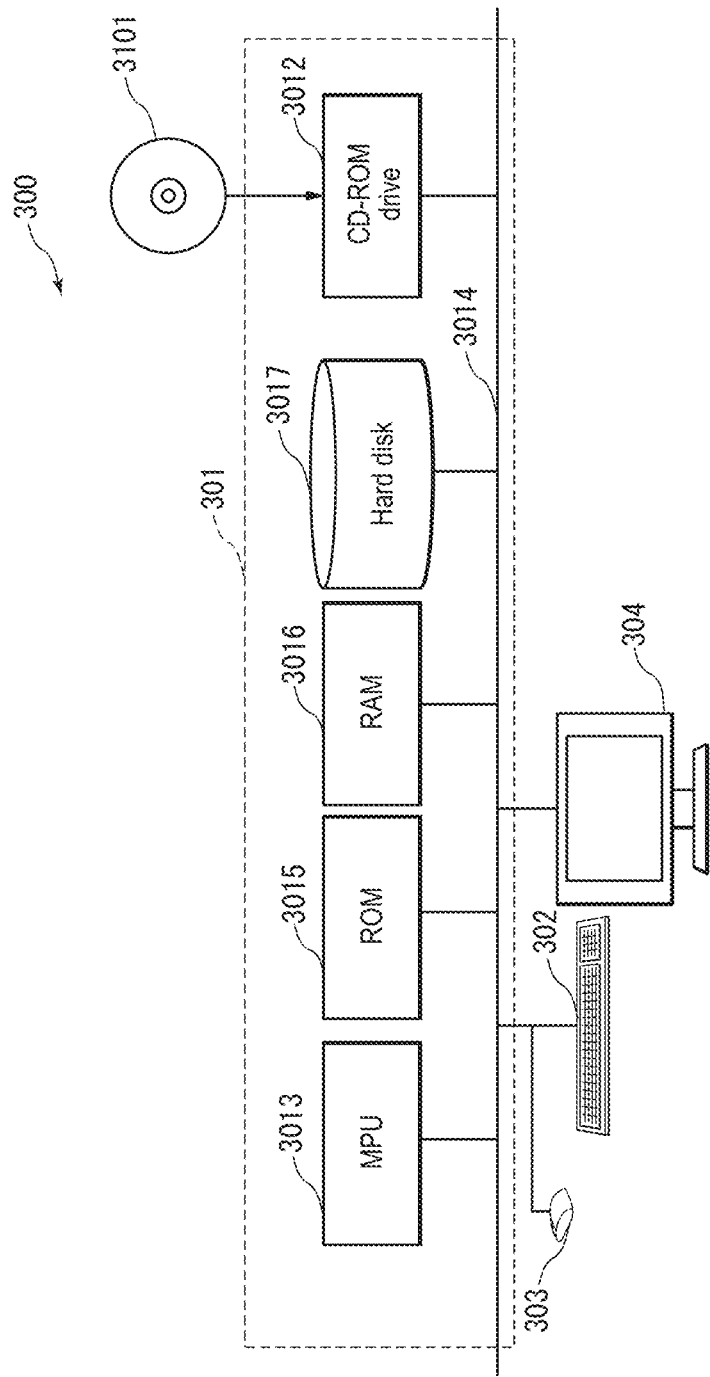
FIG. 13 is a block diagram showing the internal configuration of the computer system in the embodiment.
Figure 14:
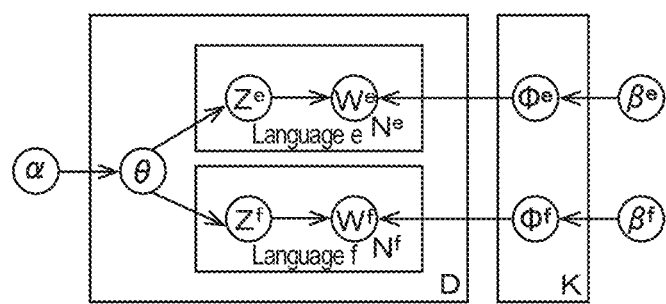
FIG. 14 is a diagram showing a graphical model according to conventional techniques.

FIG. 12 shows the external appearance of a computer that executes the programs described in this specification to realize the topic inferring apparatus 1 and the like in the foregoing various embodiments. The foregoing embodiments may be realized using computer hardware and a computer program executed thereon. FIG. 12 is a schematic view of a computer system 300. FIG. 13 is a block diagram showing the internal configuration of the system 300.

In FIG. 12, the computer system 300 includes a computer 301 including a CD-ROM drive 3012, a keyboard 302, a mouse 303, and a monitor 304.

In FIG. 13, the computer 301 includes not only the CD-ROM drive 3012, but also an MPU 3013, a bus 3014 connected to the MPU 3013 and the CD-ROM drive 3012, a ROM 3015 in which a program such as a boot up program is to be stored, a RAM 3016 that is connected to the MPU 3013 and is a memory in which a command of an application program is temporarily stored and a temporary storage area is provided, and a hard disk 3017 in which an application program, a system program, and data are to be stored. Although not shown, the computer 301 may further include a network card that provides connection to a LAN.

The program for causing the computer system 300 to execute the functions of the topic inferring apparatus 1 and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the topic inferring apparatus 1 and the like in the foregoing embodiments. The program may only include a command portion to call an appropriate function (module) in a controlled mode and obtain desired results. The manner in which the computer system 300 operates is well known, and thus a detailed description thereof has been omitted.

Furthermore, the computer that executes this program may be a single computer, or may be multiple computers. That is to say, centralized processing may be performed, or distributed processing may be performed.

In the foregoing embodiments, each process may be realized as centralized processing using a single apparatus, or may be realized as distributed processing using multiple apparatuses.

The present invention is not limited to the embodiment set forth herein. Various modifications are possible within the scope of the present invention.

INDUSTRIAL APPLICABILITY

As described above, the topic inferring apparatus according to the present invention has an effect that it is possible to improve the level of precision in inferring a crosslingual topic, by also taking an alignment in the level of segments that are smaller than documents into consideration, and thus this apparatus is useful, for example, as an apparatus for performing crosslingual document classification.

LIST OF REFERENCE NUMERALS

1 Topic inferring apparatus
10 Document set storage unit
11 Alignment management unit
12 Word distribution information storage unit
13 Word distribution information acquiring unit
14 Document topic distribution generating unit
15 Segment set acquiring unit
16 Segment topic distribution generating unit
17 Word topic determining unit
18 Segment-level alignment acquiring unit
19 Boundary inferring unit

The invention claimed is:
1. A topic inferring apparatus comprising:
a document set storage unit in which a multilingual document set is stored, which is a set of two or more documents in different languages each having two or more segments, the segments being a part of a document;
an alignment management unit in which one or more segment-level alignments are managed, each of which is an alignment between two or more segments constituting two or more documents contained in the multilingual document set, and is an alignment between two or more segments contained in different documents;
a word distribution information storage unit in which word distribution information indicating a word distribution of each of two or more topics is stored in association with each of two or more languages;
a document topic distribution generating unit that probabilistically acquires document topic distribution information indicating a topic distribution in the multilingual document set, the topic distribution being common to documents in two or more languages;
a segment topic distribution generating unit that probabilistically acquires, for one or more segment sets having two or more segments associated with each other in the one or more segment-level alignments, or for one or more segment sets and one or more segments not associated in the one or more segment-level alignments, segment topic distribution information indicating a topic distribution, and indicating the same topic distribution for two or more segments constituting the segment sets, using the document topic distribution information of documents containing segments; and a word topic determining unit that probabilistically determines, for each word contained in two or more documents contained in the multilingual document set, a topic of that word, using segment topic distribution information of a segment containing the word, and outputs the topic.

2. The topic inferring apparatus according to claim 1, further comprising:

a segment set acquiring unit that acquires one or more aligned segment sets, using the segment-level alignments, wherein the segment topic distribution generating unit generates, for one or more segment sets acquired by the segment set acquiring unit, or for one or more segment sets acquired by the segment set acquiring unit and one or more segments not associated in the one or more segment-level alignments, segment topic distribution information, from a Pitman-Yor process using a base measure, which is document topic distribution information of a document containing one or more segments, a predetermined concentration parameter, and a predetermined discount parameter.

3. The topic inferring apparatus according to claim 1, wherein the word topic determining unit acquires, for each document in two or more languages, and for each segment contained in each document, a latent topic, which is a hidden variable, from a multinomial distribution in which segment topic distribution information of a segment is taken as a parameter, for each word position contained in each segment, probabilistically determines a topic of each word using the latent topic and word distribution information corresponding to the document, and outputs the topic.

4. The topic inferring apparatus according to claim 1, further comprising:

a segment-level alignment acquiring unit that calculates a similarity between segments contained in two or more documents in different languages, contained in the multilingual document set, and acquires one or more segment-level alignments using the similarity, wherein the one or more segment-level alignments in the alignment management unit are the segment-level alignments acquired by the segment-level alignment acquiring unit.

5. A topic inferring method using a storage medium including:

a document set storage unit in which a multilingual document set is stored, which is a set of two or more documents in different languages each having two or more segments, the segments being a part of a document;

an alignment management unit in which one or more segment-level alignments are managed, each of which is an alignment between two or more segments constituting two or more documents contained in the multilingual document set, and is an alignment between two or more segments contained in different documents; and a word distribution information storage unit in which word distribution information indicating a word distribution of each of two or more topics is stored in association with each of two or more languages, the method realized by a document topic distribution generating unit, a segment topic distribution generating unit, and a word topic determining unit, comprising:

a document topic distribution generating step of the document topic distribution generating unit probabilistically acquiring document topic distribution information indicating a topic distribution in the multilingual document set, the topic distribution being common to documents in two or more languages;

a segment topic distribution generating step of the segment topic distribution generating unit probabilistically acquiring, for one or more segment sets having two or more segments associated with each other in the one or more segment-level alignments, or for one or more segment sets and one or more segments not associated in the one or more segment-level alignments, segment topic distribution information indicating a topic distribution, and indicating the same topic distribution for two or more segments constituting the segment sets, using the document topic distribution information of documents containing segments; and a word topic determining step of the word topic determining unit probabilistically determining, for each word contained in two or more documents contained in the multilingual document set, a topic of that word, using segment topic distribution information of a segment containing the word, and outputting the topic.

* * * * *